US006760731B2

(12) United States Patent
Huff

(10) Patent No.: US 6,760,731 B2
(45) Date of Patent: Jul. 6, 2004

(54) GENEALOGY REGISTRY SYSTEM

(76) Inventor: Kent W. Huff, 1748 W. 900 South, Spanish Fork, UT (US) 84660

(*) Notice: Subject to any disclaimer, the term of this patent is extended or adjusted under 35 U.S.C. 154(b) by 137 days.

(21) Appl. No.: 09/809,742

(22) Filed: Mar. 15, 2001

(65) Prior Publication Data
US 2002/0032687 A1 Mar. 14, 2002

Related U.S. Application Data
(60) Provisional application No. 60/189,697, filed on Mar. 15, 2000.

(51) Int. Cl.[7] .............................................. G06F 17/30
(52) U.S. Cl. ........................ 707/101; 707/6; 707/103 Y
(58) Field of Search .............................. 707/1, 2–7, 10, 707/100, 101, 102, 103 R, 103 Y; 705/1; 434/154

(56) References Cited
U.S. PATENT DOCUMENTS 5,467,471 A * 11/1995 Bader ............................ 707/1
6,421,656 B1 * 7/2002 Cheng et al. ................. 707/2
6,427,123 B1 * 7/2002 Sedlar ........................ 702/2

* cited by examiner

Primary Examiner—Safet Metjahic
Assistant Examiner—Marc Filipczyk
(74) Attorney, Agent, or Firm—Clayton, Howarth & Cannon, P.C.

(57) ABSTRACT

A worldwide genealogy data storage and retrieval system for implementation on the internet is described, wherein genealogical data from every source can be collected, reviewed, revised, extended, consolidated, summarized, indexed, lineage-linked, and displayed. The invention further relates to a method and apparatus for cooperative publishing and distribution of genealogical data. The invention allows owners of lineage-linked genealogical data to publish the data in any size increments and for buyers to select and retrieve any number of names and associated data. An integrated micropayment system requires users of the data to make payments for each increment of data received, and royalties are paid to the owners of the data from these payments.

46 Claims, 7 Drawing Sheets

| Automatic Research Coordination Report |||||
|---|---|---|---|
| High Interest Names in Descending Order of Apparent Interest |||||
| Surname | Birth Year | Name ID | Users Interested |
| Quigley | 1741 | 00011101000199 | 1020 |
| Davidson | 1618 | 00021101000188 | 850 |
| Valesco | 1820 | 00031101000177 | 755 |
| Franklin | 1850 | 00041101000166 | 740 |
| Russell | 1810 | 00051101000155 | 690 |
| Johnson | 1720 | 00061101000144 | 585 |
| Larsen | 1650 | 00071101000133 | 510 |
| Memmett | 1800 | 00081101000122 | 475 |
| Naylor | 1610 | 00091101000120 | 464 |
| Youd | 1590 | 02011101000199 | 453 |
| Adams | 1750 | 03011101000199 | 432 |
| Henderson | 1790 | 04011101000199 | 422 |
| Smith | 1600 | 05011101000199 | 410 |
| Thomas | 1730 | 06011101000199 | 386 |
| Ehlers | 1810 | 07011101000199 | 359 |
| Whitney | 1730 | 08011101000199 | 262 |
| Peterson | 1760 | 09011101000199 | 245 |

*FIG. 4*

GENEALOGY REGISTRY SYSTEM

CROSS-REFERENCE TO RELATED APPLICATIONS

This application claims the benefit of U.S. Provisional Application No. 60/189,697, filed Mar. 15, 2000, which is hereby incorporated herein by reference.

STATEMENT REGARDING FEDERALLY SPONSORED RESEARCH OR DEVELOPMENT

Not applicable.

REFERENCE TO A COMPUTER PROGRAM LISTING APPENDIX

Two duplicate compact discs containing the following files were submitted with this application and are hereby incorporated into the specification by reference: Genealogy Site Registry Map (Microsoft Word Document, 29.5 KB, Aug. 16, 2003), Genealogy Site Registry Map (Text Document, 7.97 KB, Aug. 16, 2003), Server Database Tables (Microsoft Word Document, 24.0 KB, Aug. 16, 2003), Server Database Tables (Text Document, 4.79 KB, Aug. 16, 2003), Genealogy 3D VRML code sample V013.wrl (8.35 KB, May 15, 2000), BLDHTML1.PRG (16.5 KB, Oct. 13, 1999), BLDHTML2.PRG (5.47 KB, Oct. 13, 1999), BLDKEYO1.PRG (1.65 KB, Oct. 12, 1999), BROWSER-.PRG (637 bytes, Oct. 12, 1999), FAM1.PRG 8.45 KB, Oct. 7, 1999), INDIV1.PRG (14.5 KB, Oct. 11, 1999), NOTE-EXT.PRG (2.04 KB, Oct. 11, 1999), PART1.PRG (3.95 KB, Oct. 12, 1999), PART2.PRG (3.23 KB, Oct. 13, 1999), STATS001.PRG (2.67 KB, Oct. 13, 1999), STATS002.PRG (1.78 KB, Oct. 13, 1999), and (all of the following of which were created Jun. 10, 2000) CHARGE02 (5.73 KB), DBPUB038 (6.62 KB), DBPUB040 (9.08 KB), DBPUB041 (10.4 KB), DBPUB045 (22.3 KB), DBSRC018 (6.81 KB), DBSRC020 (14.8 KB), DBSRC022 (6.69 KB), DBSRC023 (6.70 KB), DBSRC024 (14.1 KB), DBSRC038 (7.40 KB), DBSRC040 (10.1 KB), DBSRC041 (10.3 KB), DBSRC045 (22.7 KB), DBSRC138 (6.93 KB), DBSRC140 (7.86 KB), DBSRC141 (12.1 KB), DBSRC145 (26.0 KB), DBSRC146 (11.9 KB), DBSRC147 (21.3 KB), DBSRC155 (19.5 KB), DBSRC160 (8.38 KB), DBSRC161 (28.7 KB), DBSRC163 (19.7 KB), DBSRC165 (19.7 KB), DBSRC167 (27.0 KB), DBSRC169 (19.8 KB), DBSRC170 (6.90 KB), DBSRC171 (19.8 KB), DBSRC220 (6.36 KB), DBSRC238 (6.78 KB), DBSRC240 (9.56 KB), DBSRC241 (10.3 KB), DBSRC245 (22.9 KB), DBSRC258 (6.94 KB), DBSRC260 (7.65 KB), DBSRC261 (11.2 KB), DBSRC265 (21.9 KB), DBSRC266 (11.4 KB), DBSRC267 (20.1 KB), HOBADD01 (4.74 KB), HOBAN018 (6.83 KB), HOBAN020 (14.9 KB), IDXADD01 (4.59 KB), INPUT010 (1.24 KB), INPUT012 (3.07 KB), INPUT020 (12.6 KB), LOGBY01 (5.28 KB), LOGHOB01 (3.09 KB), LOGIDX01 (3.05 KB), MENtJIDU1 (4.18 KB), MENUIDX1 (5.93 KB), STATS001 (3.52 KB), WELCOME2 (5.77 KB), WS005 (7.90 KB), WS010 (11.6 KB), WS015 (4.64 KB).

BACKGROUND OF THE INVENTION

This invention relates to processing of genealogical data. More particularly, this invention relates to a genealogy registry system for collecting, summarizing, indexing, lineage-linking, and displaying genealogical information. Furthermore, this invention also relates to electronic publishing applications using electronic networks.

Today's worldwide genealogy data records environment can be summarized in general terms as comprising thousands of relatively large public record sets in non-lineage-linked format, mostly on paper or microfilm, plus millions of small collections of lineage-linked names, mostly held by individual persons. Most of these small collections are in paper form, but increasingly are in personal computer (PC) form. These family collections of relatives' names may be made up of family non-public records, plus extracts from any number of larger public record sets.

There are huge national collections of records, such as the U.S. censuses, that may contain hundreds of millions of names. Other national records include military and immigration records. At the state level, there are the usual birth, marriage, death, and perhaps tax records. At the local or county level, one might find land, burial, and court records.

For the serious genealogy hobbyist or professional, going beyond family records usually means learning to use and access many new sets of records, perhaps finding few, if any, relatives' names in any one record set. This means there is a huge individual learning curve and much raw record scanning for the small amount of actual data found and used. The learning curve becomes enormous when the researcher must learn a language to trace ancestors' lives in another country with records in another language.

If the overall goal were to complete all the clerical records processing and name linking for a whole nation or for the entire world, the current process is extremely inefficient. The usual technique for solving this kind of problem is to use specialization to make the workers' efforts more efficient. In the case of genealogy and the related records complexities, the efficiency improvement rates could be in the hundreds or even thousands of times.

It appears that the most advanced system in the category of a potentially worldwide, lineage-linked system is the Ancestral File (AF) operated by The Church of Jesus Christ of Latter-day Saints. AF stores about 30 million names, most of them linked into families and pedigrees, but only minimal data about each person are held there. Error rates have been estimated to be as high as 30% on names and linking relationships. AF has been available for a decade or more on CD-ROM at family history centers and a few other locations sponsored by the church. Since April 1999, a limited version has been available on the Internet. Although theoretically it could contain data on anyone in the world, AF mostly pertains to the families of the some five million members of the church in the United States. Since it was designed and is intended to support church doctrine and programs, people outside the church are less likely to want to participate, even if it had many more features. A more neutral and sophisticated system is needed.

Ancestral File accepts additions and corrections in paper or diskette form, but cannot be updated directly. A small group of people is responsible for updating the AF database. Due at least in part to these factors, the process is such that there is at least a two-year wait between submitting new data and being able to see the updated version on CD-ROM. Most computer users have come to expect immediate responses to their entries. Waiting two years to find out whether submitted information was accepted correctly by a genealogy system calls for more patience than most people are willing to give. The actual update process is done automatically, with no critical human review. Further, only one version of the data is kept. This means that donors can submit data, wait two years, and then find out that the data were entered incorrectly, were not entered at all, or somebody else's data were used instead. In the two-year waiting period, the data might have been entered, but later might have been replaced by other data before either version became accessible. This means that the highest quality data can be replaced by inferior data. Obviously, this is not a satisfactory system. It is almost impossible to have significant cooperation or synchronized specialization with such a system.

The most basic needs of a good genealogy registry system are to be able to check whether others have already done the work one wishes to see or do, notify the world of one's work plans, submit data as they are collected, immediately check the results, and be certain that the data will remain in the database regardless of the activities of others. Following these steps it would also be desirable to be able to look for extensions to the data within work supplied by others and to link data from two or more contributors such that anyone could follow and examine the extensions.

There are many other features of a genealogy registry system that would be very useful, but even the basic features are not currently available. For example, a system is needed that quickly assembles all existing genealogical data and then adds much more to it until all of the available records have been mined and the data integrated. A truly worldwide system would allow for use of multiple languages, perhaps with transliteration and translation to English for universal access. Something as exotic as a three-dimensional virtual reality interface, to enhance the family history data viewing experience by showing all the three-dimensional network reality of family relationships, has never been attempted, perhaps because there is no data source today with the depth and quality required to drive such a feature. Even a much simpler form that displays all known family relationships for one person is not available. This would be a step toward a true three-dimensional network world, but could still be displayed in a more conventional two-dimensional format.

Besides the lack of service and convenience to genealogy hobbyists and professionals, there is also the missed opportunity of planning to enhance the recently completed human genome project. An extensive lineage-linked genealogy system would allow research projects and improvements to health that would be impractical without quick access to hundreds of thousands of family connections.

In view of the foregoing, it will be appreciated that providing a genealogy registry system that meets these and many other deficiencies of current systems would be a significant advancement in the art.

BRIEF SUMMARY OF THE INVENTION

It is an advantage of the present invention to provide a genealogy registry system that permits quick assembly of all existing genealogical data.

It is also an advantage of the invention to provide a genealogy registry system that permits use of multiple languages.

It is another advantage of the invention to provide a genealogy registry system that contains a three-dimensional virtual reality interface for showing all the three-dimensional reality of family relationships.

It is still another advantage of the invention to provide a genealogy registry system that processes old records into a durable digital format, thus preserving old and fragile records.

It is yet another advantage of the invention to provide a genealogy registry system that permits participants to know the state of the system, especially showing what is not contained in the system such that such missing information can be found and added.

It is another advantage of the system to provide a genealogy registry system that permits a specific user to obtain a summary of data that relate to such user.

It is still another advantage of the invention to provide a genealogy registry system that permits two randomly selected individuals to discover if they have a common ancestor.

It is yet another advantage of the invention to provide a genealogy registry system that provides for time-dating of place names and associating places with latitudinal and longitudinal data.

It is a still further advantage of the invention to provide a genealogy registry system that permits associating names with standardized source record references.

It is another advantage of the invention to provide a genealogy registry system that permits incorporation of existing large data collections.

It is still another advantage of the invention to provide a genealogy registry system that permits the easy and automatic absorption and consolidation of large amounts of quality data that exist in Genealogical Data Communications (GEDCOM) format.

It is yet another advantage of the invention to provide a pay-per-view micropayments system such that money is collected from users of the genealogy registry system and part of the collected money is paid to publishers of the data in the form of royalties.

These and other advantages can be addressed by providing a genealogy registry system for collecting, summarizing, indexing, lineage-linking, and displaying all of the world's genealogy records information on a computer comprising:
  (a) a central server database comprising
    (i) a plurality of contributors' data spaces for storing genealogical data in lineage-linked form,
    (ii) a submission link space coupled to the plurality of contributors' data spaces for making and storing links between genealogical data items in each of the plurality of contributors' data spaces, and
    (iii) a third-party link space coupled to the plurality of contributors' data spaces for making and storing links between genealogical data items between the plurality of contributors' data spaces;
  (b) a normal text and graphics interface coupled to the central server database;
  (c) a basic data display coupled to the normal text and graphics interface;
  (d) a data status and management mechanism coupled to the normal text and graphics interface for monitoring quantity and quality of data;
  (e) a manual keying interface coupled to the central server database for inputting and correction of data; and
  (f) a data conversion and automated input coupled to the central server database for converting data into usable format and inputting large data files.

In an illustrative embodiment of the invention, the genealogy registry system further comprises (g) a workstation functions interface coupled to the central server database for converting and consolidating data into usable format. Another illustrative embodiment of the invention the basic data display comprises a mechanism for billing by segment of information displayed. Illustratively, the plurality of contributors' data spaces has a capacity for storing the names and data on up to 10 billion people. Still further, the system illustratively further comprises a plurality of interactive self-service internet terminals and central servers configured for accepting genealogical data from a plurality of publishers and displaying such genealogical data to a plurality of users. Illustratively, the system is configured for internet transactions to allow updates and review by a plurality of selected persons. The central server database illustratively comprises a structure for storing one or more data items selected from the group consisting of basic identifying data, explanatory text, biographical text, source references, photographs, and images.

In another illustrative embodiment of the invention, the genealogy registry system further comprises a program permitting both minimal data display and update and full detail data display and update. The system also illustratively further comprises a program and data structure configured for storing latitude and longitude indicators for all major identifying events, including birth, death, marriage, and burial, such that tables, maps, and reports can be created for correlating such events with location. Moreover, the system illustratively further comprises a program and data structure configured for storing place names by date and by latitude and longitude. Still further, the system illustratively further comprises a program and data structure for storing medical, genetic, and health history data. Further yet, the system illustratively further comprises a mechanism for permanent storage of assembled data.

In still another illustrative embodiment of the invention, the genealogy registry system further comprises a program and data structure for storing and processing data in a plurality of languages using the language and characters of original records with transliteration and translation to English.

In yet another illustrative embodiment of the invention, the genealogy registry system further comprises a program and data structure for reserving and assigning to a single publisher creation and maintenance of a selected set of names based on at least one of time, place, surname, or record set, and indexes to such assigning for notifying others of current assignments. Illustratively, the system further comprises a program and data structure configured for permitting data submissions by a publisher to be stored independent of submissions by other publishers while being available for integration with other data submissions through a separate system of linking names that is accessible to such other publishers. Further, the system illustratively further comprises a program and data structure for allowing a selected person to link names within or between one or more other publisher's submissions without changing the underlying data. Still further, the system illustratively further comprises a program and data structure configured for permitting an authorized person to create shadow delete records wherein duplicate names can be removed from search lists and duplicate data can be hidden from users without being deleted from the database.

In still another illustrative embodiment of the invention, the genealogy registry system further comprises a program for providing summaries by surname and oldest birth date linked to a user or nearest relative thereof. Illustratively, the genealogy registry system further comprises a program for identifying a closest common ancestor, if any, for two randomly selected people. Further, the system illustratively further comprises a program for displaying all relationships for a selected person. Moreover, the system illustratively further comprises a read-only virtual reality user interface configured for permitting a user or group of users to receive immediate visual and aural access to the data in the database, wherein the data appear as objects in a three-dimensional world with which the user can interact. Still further, the system illustratively further comprises a virtual reality user interface configured for permitting a user or group of users to receive immediate visual and aural access to the data in the database, wherein the data appear as objects in a three-dimensional world with which the user can interact, and whereby an authorized user can modify the database.

Another illustrative embodiment of the genealogy registry system further comprises a mechanism configured for allowing a publisher or other authorized person to examine the database for assessing completeness of coverage of a selected time, place, surname, or record set such that the publisher can discover what data are in the database and what data are missing. The system also illustratively further comprises first-level indexes to names and source records such that measures of population and record coverage can be estimated; second-level cross references between source records and names such that measures of accuracy and duplication can be applied to the data, and measures of completeness of coverage of a record set can be estimated, and cross indexing can be accomplished between multiple versions or copies of the same record set; and third-level cross references of source-to-dissimilar-source records such that the database can supply consolidated cross reference indexes among multiple record sources linked through specific people.

Still another illustrative embodiment of the genealogy registry system further comprises a program for automatic conversion of a user's lineage-linked data into a format suitable for automatic update of the database over the Internet. The system illustratively further comprises a program and data structure configured for capturing, converting, and consolidating lineage-linked genealogy data collections stored for public view on the Internet. Illustratively, the lineage-linked data collections are automatically analyzed and divided into trees of interconnected names. Further, the genealogy registry system illustratively further comprises a program configured for analyzing incoming lineage-linked data collections for consolidation with existing data, eliminating duplicates, and finding and displaying missing linkages in incomplete pedigrees. Still further, the system illustratively further comprises a program and data structure configured for supporting automated mass consolidation of unlinked source records into multi-generation lineage-linked form. The system also illustratively further comprises a program and data structure configured for converting data from Ancestral File and International Genealogical Index into a format compatible with the present system and for online review and correcting of such data. Further, the system illustratively further comprises a program and data structure configured for automated comparison of overlapping lineage-linked genealogy files and removal of duplicates and merging of data. Still further, the system illustratively further comprises a program and data structure for coding of confidence levels or accuracy indicators on data elements selected from the group consisting of birth dates, birth places, and relationship links.

Another illustrative embodiment of the genealogy registry system further comprises a program and data structure configured for accounting of royalty payments to publishers of data based on use of such data and charging user fees to users of such data. The parameters for royalty payments and user fees can illustratively be varied according to user, publisher, name, and data element. Illustratively, the system further comprises a program and data structure configured for allowing a user to separately select for viewing each item of data about a name. The system illuustratively further comprises a program and data structure configured for billing a user only once for each item of data viewed, regardless of the number of times the item is viewed. Moreover, the system illustratively further comprises a program and data structure configured for controlling a number of names accessed per unit time.

In yet another illustrative embodiment of the invention, the genealogy registry system further comprises a program and data structure configured for producing a copy of the central server database wherein said copy is configured such that data quality parameters can be different than for the central server database. Illustratively, users of the copy are billed at a different rate than are users of the central server database.

Another illustrative embodiment of the invention illustratively further comprises a program and database structure configured for producing a research coordination report for identifying areas of user interest based on user name selection and fee payment patterns and for facilitating research planning and contracting.

Still another illustrative embodiment of the genealogy registry system further comprises a program and data structure configured for matching one or more publishers of research data with one or more users of such data. In such embodiment, one or more publishers can announce and register research plans and seek funding commitments, and one or more users can make such funding commitments.

A method for collecting, summarizing, indexing, lineage-linking, and displaying genealogical records information comprises:
(a) providing a genealogy registry system on a computer comprising:
 (i) a central server database comprising
  (1) a plurality of contributors' data spaces for storing genealogical data in lineage-linked form,
  (2) a submission link space coupled to the plurality of contributors' data spaces for making and storing links between genealogical data items in each of the plurality of contributors' data spaces, and
  (3) a third-party link space coupled to the plurality of contributors' data spaces for making and storing links between genealogical data items between the plurality of contributors' data spaces,
 (ii) a normal text and graphics interface coupled to the central server database,
 (iii) a basic data display coupled to the normal text and graphics interface,
 (iv) a data status and management mechanism coupled to the normal text and graphics interface for monitoring quantity and quality of data,
 (v) a manual keying interface coupled to the central server database for inputting and correction of data, and
 (vi) a data conversion and automated input coupled to the central server database for converting data into usable format and inputting large data files, and storing genealogical data on the central server database in lineage-linked form;
(b) establishing links between genealogical data items; and
(c) displaying genealogical data in response to a request for data and billing a user for data displayed in response to the request.

A method for publishing lineage-linked genealogical data using a computer comprises:
(a) receiving and storing lineage-linked genealogical data from a publisher;
(b) inputting into the computer a payment identifier specifying a credit card account associated with a user;
(c) permitting the user to access lineage-linked genealogical data stored in the computer;
(d) charging the credit card account on a pay-per-view basis according to lineage-linked genealogical data accessed by the user; and
(e) crediting a royalty payment to the publisher correlated with charges to the user for accessing lineage-linked genealogical data received from the publisher.

BRIEF DESCRIPTION OF THE SEVERAL VIEWS OF THE DRAWINGS

FIG. 4 shows an illustrative automatic research coordination report according to the present invention.

DETAILED DESCRIPTION

Figure 1:
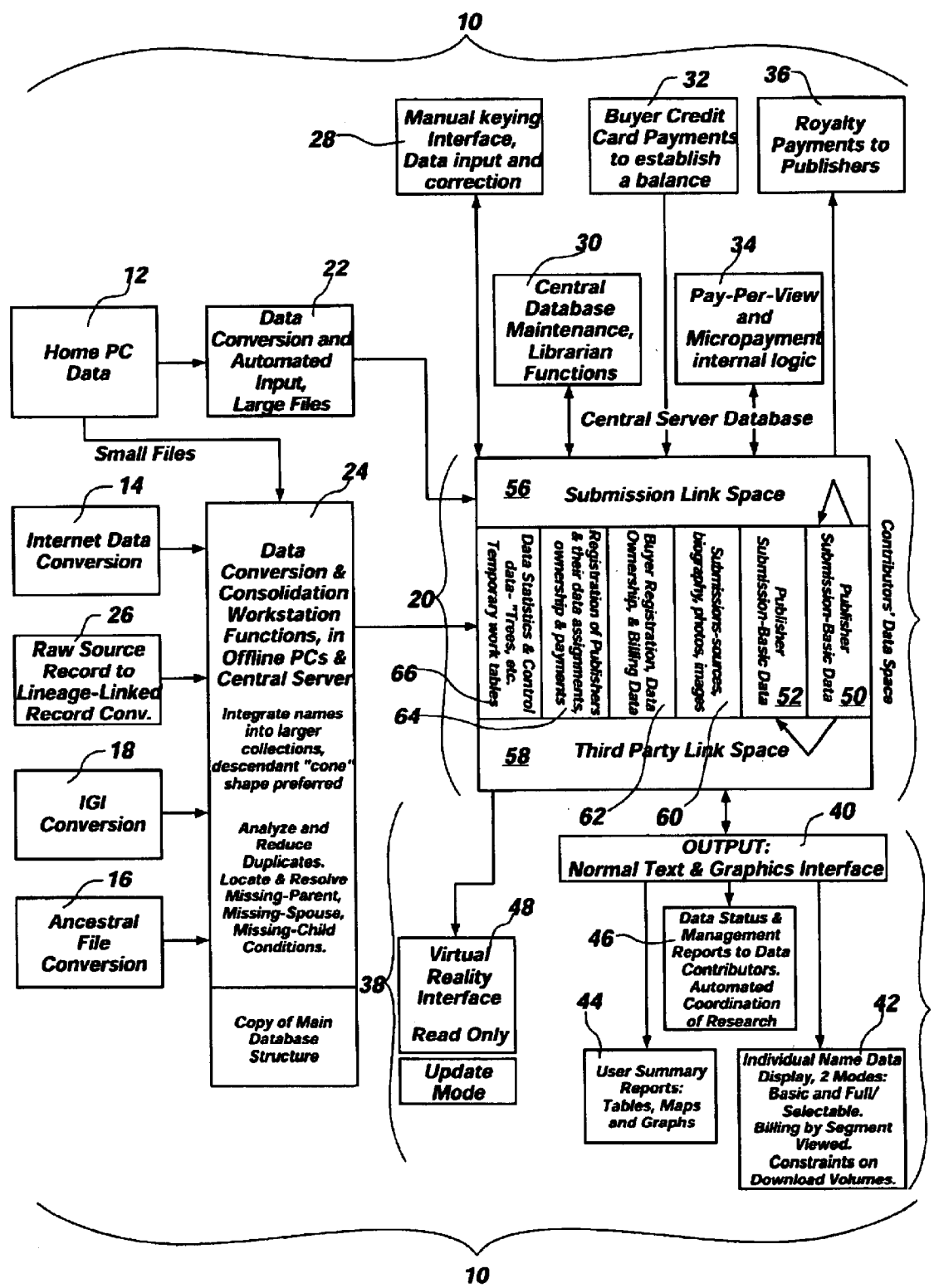
FIG. 1 shows a block diagram of the genealogy registry system according to the present invention, including data sources, the main server database, and output options.

Before the present genealogy registry system is disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise. Thus, for example, reference to a genealogy registry system containing "a program" includes reference to two or more of such programs, reference to "a data structure" includes reference to one or more of such data structures, and reference to "a central server database" includes reference to two or more of such central server databases.

In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps. "Comprising" is to be interpreted as including the more restrictive terms "consisting of" and "consisting essentially of."

As used herein, "consisting of" and grammatical equivalents thereof exclude any element, step, or ingredient not specified in the claim.

As used herein, "consisting essentially of" and grammatical equivalents thereof limit the scope of a claim to the specified materials or steps and those that do not materially affect the basic and novel characteristic or characteristics of the claimed invention.

As used herein, a "publisher" or "contributor" is a person who submits genealogical data for inclusion in the genealogy registry system.

As used herein, a "user" or "searcher" is a person who obtains genealogical data from the genealogy registry system.

In its simplest, overview form, the system comprises a large Internet site connected intermittently to many thousands or even millions of PCs, located anywhere in the world, plus local and remote connections to a smaller number of large and powerful PCs, which are referred to here as data consolidation workstations.

In the first prototype version of the system there are about 200 Microsoft Visual Basic Script programs, otherwise known as Active Server Pages, which provide most of the logic at the central site. The operating system is Microsoft Windows NT Server. The database mechanism is Microsoft Access for development, and Microsoft SQL Server for production use. It should be noted that there are other operating systems that also accept Active Server Page (ASP) code, and the database type used is relational, of which there are several competing versions. The full production version of the system might use one or more of these differing system software components.

There are numerous HTML pages that contain menus of transactions, instructions on how to use the system, history of the project, and the like.

A set of Microsoft Visual FoxPro programs and data tables, about 30 modules in all, are packaged for downloading from the central site to a participant's PC. These modules are used to convert lineage-linked data into HTML format and automatically update the central database.

FIG. 1 shows a block diagram illustrating the major components of the genealogy registry system 10 according to the present invention. It illustrates how the system interacts with the world. It shows numerous data input sources and processes, the central database structure, some internal processing categories, and numerous output categories. Different sets of transactions are used by publishers and users. Some user transactions are free, while some involve billing for data viewed.

Input. FIG. 1 shows that there are four illustrative examples of sources for lineage-linked data: Home PC Data 12, Internet Data 14, Ancestral File (AF) 16, and International Genealogical Index 18 (IGI; a large database operated by The Church of Jesus Christ of Latter-day Saints containing some 300 million names and including limited linking data, such as parent-child and husband-wife). Where the home PC data set is large and is owned and maintained by a serious genealogist, the data may be uploaded to the central server database 20 using the downloaded Visual FoxPro programs, represented by the data conversion box 22. Smaller files from less serious genealogists will be collected by file transfer or diskette to a consolidation workstation 24, where such smaller files undergo various processes and are included in a much larger name collection to be sent on to the central server database 20.

Another category of input data is described as Raw Source Records 26. These data may come from many different sources including direct transfer from other computers, or manual and automated record conversion from paper and microfilm. Such data require more extensive processing than data that are already lineage-linked.

The Data Conversion and Consolidation Workstation. The Data Conversion and Consolidation Workstation 24 contains three kinds of programs: (1) for accepting many small lineage-linked data collections from individuals or from locations on the Internet and process them into much larger consolidated collections; (2) for accepting large sets of raw data, such as a series of U.S. decennial censuses, and turn them into a set of lineage-linked families; and (3) for accepting large, specialized, machine-readable collections such as the International Genealogical Index (IGI) and Ancestral File (AF) and processing them into a lineage-linked format suitable for adding to the central server database 20. All of these functions can go on in the central Internet site, but central site performance will be improved by executing these specialized and computer-intensive operations on separate computers where possible.

Internal and Maintenance Programs and Processes. Some of the programs, called the manual keying interface 28, allow manual updates to the data and links after they have been added to the main database. Programs referred to as central database maintenance and librarian functions 30 handle general administrative functions such as updating fee schedules and devising formats for entering new types of source reference data.

Another program 32 is configured for accepting money transfers from users, through credit cards or other electronic means. Other programs 34 handle the internal user pay-per-view and micro-payment processes. Another set 36 issues periodic royalty payments to publishers.

Output. Still referring to FIG. 1, the area 38 below the main database shows the main outputs of the system. The normal text and graphics interface 40 uses different programs 42 to display name data in one of two modes, an "express" view that shows the minimum identifying data about a person and his or her links to all family members, or a selectable mode that can show anything from the minimum data up to the full data stored for that person. User billing is executed by an integrated set of programs that charge by data segment viewed, based on user preference, from the minimum segment up to the full set of segments available for that name. Another set of programs meters the outflow of data, and may limit the flow of data or change billing rates based on flow rates.

Besides the basic data display mechanism, there are also programs 44 to allow users to see summaries of data presented in table, graph, or map form.

Metadata program functions 46 are available to show database status and various database management reports so users can all participate in database improvement. Through these programs users can learn what is in the database and what is not, allowing them to better manage their time and efforts. Programs also produce reports for automated coordination of research.

Another set of programs 48 produce a virtual reality world view of the database contents using user-supplied parameters to determine the size of the virtual world. It can portray the entire database as a large building containing a network of spheres interconnected with rods, representing individuals and their family relationships. One can swing or slide through the spheres, going along relationship "rods" in any direction to find the relevant contents and limits of the current database. Touching any sphere will cause it to reveal information in addition to the name, birth date, and birth place. A menu of items available will appear.

Figure 2:
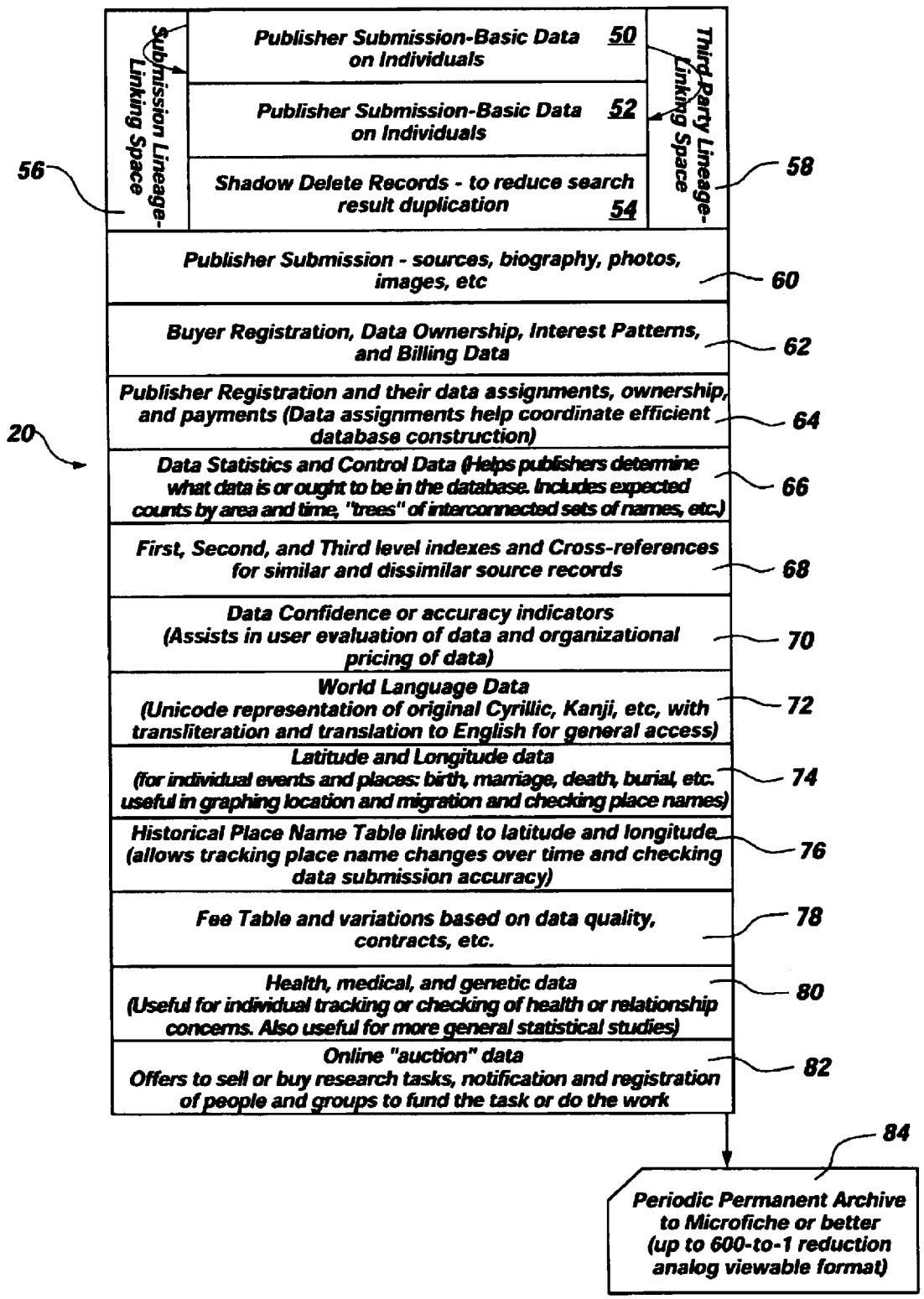
FIG. 2 shows a block diagram for describing the main kinds of data stored in the central server database according to the present invention.

Main Database. The central server database 20 is also represented in a simplified form in FIG. 1 and in greater detail in FIG. 2. Two or more sections 50, 52 (labeled "Publisher Submission—Basic Data on Individuals") provide space to store the main tables of information about individuals. Shadow Delete Records 54 provide a way to remove duplicate names from the normal search and viewing process to minimize the efforts users must expend to find the desired data. Submission Lineage-Linking Space 56 represents storage of the submission internal name-linking records. These records comprise a person-identifying number, a code showing his or her relationship to another person, and the number of that other person. There is one record for each relationship between one person and another.

A Third-Party Lineage-Linking Space 58 represents programs that allow any interested party to add links between database names without making any changes to the submission data. The link records contain the same data as the internal link records, but also contain the identifying number of the person who submits the link record.

Main Database Data Types. There are many other kinds of data that must be stored in the database. The data types listed below generally do not correspond to actual database tables in the database. Each category may represent several physical tables or only a part of one or more tables. Publisher Submission—Basic Data on Individuals 50, 52 store lineage-linked or "finished" names in large numbers—an estimated 500 million names for the United States, 500 million for Europe, and, later, data from all parts of the globe, up to a total of about 10 billion linked names. The Submission Lineage-Linking Space 56, as described above, stores the submission internal name-linking records. The Third-Party Lineage-Linking Space 58, also described above, allows any interested party to add links between database names without making any changes to the submission data. Publisher Submissions 60 is for storing a variety of information on names stored in the central server database, such as source references, biography, photos, source record images, audio and video clips, and the like. Buyer Registration, Data Ownership, Interest patterns, and Billing Data 62 is for keeping track of buyers of genealogical data, owners of data stored in the database, interest patterns of buyers, and billing data with respect to buyers of data. Publisher Registration 64 is for recording the data assignments of publishers, ownership of data by the publishers, and royalty payments to the publishers. Data assignments help coordinate efficient database construction. Data Statistics and Control data 66 helps publishers determine what data are or ought to be in the database. This information includes expected counts by area and time, "trees" of interconnected sets of names, and the like. First, Second, and Third level indexes and Cross-references 68 are for indexing and cross-referencing similar and dissimilar source records of data. Data Confidence or accuracy indicators 70 assists in user evaluation of data and in central site pricing of data. World Language Data 72 is a unicode representation of original Cyrillic, Kanji, and other characters with transliteration and translation to English for general access. Latitude and Longitude data 74 is for geographical location of individual events and places: birth, marriage, death, burial, and so forth. These latitude and longitude data are useful in graphing locations, migrations, and checking place names. Historical Place Name Table linked to latitude and longitude 76 allows tracking place name changes over time and checking data submission accuracy. Fee Table 78 is for assigning fees for data and variations based on data quality, contracts, and the like. Health, medical, and genetic data 80 are useful for individual tracking or checking of health or relationship concerns. These data are also useful for more general statistical studies. The Online Auction Data 82 automates much of the notification and negotiation process for matching one or more users (i.e., buyers) and one or more publishers (i.e., sellers) for specific genealogy research tasks.

Provision is made according to the present invention for periodic permanent archiving 84 of the database contents to microfiche or some more compact and equally durable medium. New technologies will allow up to 600-to-1 reduction for analog viewable formats.

A separate version of the database will be established with different cost and quality constraints, suitable for use by beginning publishers and users for training and data preparation. It will also be used for other low volume, less disciplined, more freeform uses, such as leaving an "I was here" or "We were here" message to the world or a time-capsule family message to future generations.

The database will store data about the people who interact with the system, such as the publishers and users. This information includes contact data and billing or royalty payment data, and pricing rates and rules.

The thousands of the people using the site will be able to prepare genealogical data to be transferred to the Internet site to be "published," as that term is used herein. A much larger number of people called "users" or "searchers" herein, will search through the central site for data that relate to their family, paying small amounts as they view new material.

The searchers are mostly people with a hobbyist's interest in genealogy. The publishers include some of that amateur group, but will also include professional and semi-professional workers who make their first or second incomes in this activity.

The people working at their home, office, or library convert the many private and public record sets that make up the world's genealogical data into lineage-linked format to add to the genealogy registry database of the present invention. There will also be some special situations where the central site is connected to devices that are involved in the direct conversion of paper or microfilm records to a computer usable format, including scanners of various kinds.

There are many web sites that store large amounts of raw unlinked genealogy data in machine-readable form. In most cases it would not be necessary to duplicate those resources, but data from these sites can be reorganized on the genealogy registry site of the present invention. There will be cases where it is convenient to collect and store unlinked data that do not appear on other sites. The main web site and workstation facilities of the present invention can help turn this new raw material into finished lineage-linked form.

Operation of the Genealogy Registry System

The main functions of the system of the present invention are to (1) collect from publishers sets of names linked into families, illustratively in descendant form, (2) allow updates and further linking with other collections of names submitted by other publishers, (3) charge small fees to buyers for names, links, and other individual and family data viewed, and (4) remit these fees as royalties to the publishers, after deducting the cost of site operation. Data interfaces will include the normal text and images in a Graphic User Interface, plus a Virtual Reality version as well.

Most large collections of genealogy data are simply huge lists of raw or unconnected names. Changing the paradigm so that each name stored and each sub-component of data about the name are separately displayed and billed, represents a huge increase in the level of computing detail that must be handled. This is one of the more important contributions of this system.

Collecting Data—Main Source. The main source of quality data is from skilled genealogists who are willing to publish their data in return for royalties. Data from publishers possessing significant quantities of genealogy data can be sent in directly from a home PC after automated conversion from a GEDCOM file. It can also be entered directly into the central database by keying data into the "express" or short-form screens or by keying it into the full data screens. It can also be mailed or sent by file transfer to a central processing site.

The descendant form of data organization is optimal because it simplifies describing boundaries between publishers' work, and it also minimizes the labor needed to further interlink the many publishers' submissions. This descendant form is sometimes referred to herein as a "cone" because the earliest ancestor in the pedigree forms the point of the cone with each succeeding generation broadening the base of the cone.

Collecting Data—Other Options. Smaller linked GEDCOM files can be collected into one central location where a special data consolidation workstation can help to match and join these names into much larger collections. These data might be chosen from among the data collections already on the Internet.

Large sets of records, such as census, land, birth, death, and the like can be prepared. Special computer assistance would then be used to create linked files out of these mostly unlinked files.

Large existing files that contain some name linking, such as the Ancestral File (AF) and International Genealogical Index (IGI), can be converted into a suitable lineage-linked form with adequate quality controls.

Improving Quality and Linking. An important function, that still remains to be done after the large descendant "cones" of linked data have been collected, is to further link names together among those cones. Typically, a descendant cone of data will comprise about one-half of the names all having the same surname, the other half being the wives and husbands who married into the "clan." Many of these imported spouses will at first not yet be connected to their parents in another surname descendant collection. When these family connections are discovered in the database, a separate set of links can be created to complete those ties between all descendant collections. The workstation and Add Link programs illustrate the algorithms used in this important process.

Sales of Pay-Per-View Data. Those seeking to find family data on the site will register, pay a small startup fee, and then begin the search process. Actually, before paying any fees, they can search far enough into the database to discover if it contains any data on their family line. After they have found the first name that is a close family member such as a father or grandfather, they can move around in the database, along links that exist. As each new name is chosen, along with the types of data to be revealed about that name, the buyer is charged a small fee and is shown the data.

After a person has selected and paid for a name and accompanying data, a record will be made so that he will not be charged again if he views that name and data again. If he elects to see more data about the person, he will be charged only for the new data.

There will be a temptation for some people or companies to try to take large numbers of names off the database to be displayed in private or commercial databases, on or off the Internet. To avoid such abuses of the system, there will be a limit on the number of names per day allowed to be downloaded. At each session logon, the number of names already viewed for that day is computed. The new name allowance will be the maximum daily limit minus those names already viewed. This limitation will allow users to satisfy their interests within a few days, while keeping the rate low enough to discourage drawing off large numbers of names for other purposes.

Optional Display of Data Through Virtual Reality Interface. The Virtual Reality interface allows a user to view large amounts of family data in 3-D network form, without the constraints of having to make constant keyboard entries to control the navigation and viewing in two dimensions of a 3-D network of names. This convenience and enhanced experience will require the users to pay an operating premium for the names seen, plus it will require that they have access to a faster Internet link, and a powerful PC with a large monitor. Even more sophisticated virtual reality equipment could be used with the same data to give the impression of a room-sized or movie-sized screen, with direct participant involvement.

Function and Module Lists. In the next section the function menus as they appear in the website are described, with an explanation of what each operation does. For the next lowest level of detail, see the Site Module Map (Appendix) which lists all modules and their functions and relationships. The lowest level of detail is the program listings themselves that demonstrate in complete detail how each function is accomplished.

Publishing. This system creates an alternative place for publishing genealogy data. When data are published in a book, many people will never even realize that the book might have some data of interest to them, since only the title is likely to be listed, and the title usually only includes a single person's name or a single surname. The book sales may be quite low because people usually only want a small segment of the book. When all the names are published and indexed on the Internet, then there should be more sales, because people can find, select, and pay for just the data they want. There will likely be sales of fewer data to any particular person, but there will be sales to many more people. Publishing routines can be added to the system for facilitating publishing of do-it-yourself books. The user can specify the data, to be in ascending or descending form, and let the system collect and print it all. Editorial support can also be available.

Overcoming Duplication and Loss. Up to now the genealogy procedures the world has used comprise paper systems or relatively small accumulations of names in linked electronic form on a home PC. Online internet sources are mostly limited to copies of the PC format data or large lists of raw data such as births, deaths, and the like. Nobody has attempted the online accumulation and comparison of data from multiple sources with the goal of accurate linking, and to allow for multiple data interpretations so that a solution or compromise could finally be reached without loss of any contributed data.

Today there is massive duplication of effort by earnest people lacking the best tools. The current system is the needle-in-the-haystack approach to genealogy. Nearly every new name or family sought can require going to a new set of records, and each new set of records may require a whole new set of skills and perhaps even a new language. It is believed that enough energy is expended in one year to complete the entire system and database described herein.

Social Benefits. The system will first help hobbyists and roots searchers to quickly learn of their past kindred. This can have the effect of strengthening the family and the nation as other genealogists have commented. But it can also have many other benefits. It will help make the study of genetic diseases many times easier than today. As a companion to the Human Genome project sponsored by the National Institutes of Health, which recently published a first draft of the sequence of the human genome, the present invention could provide the data needed to quickly trace genetic histories so that sophisticated theories of genetic transmission could be examined.

Efficiencies. The main efficiency of the system is the ability if provides for tens of thousands of people to share, evaluate, correct, update, and link data in near-real-time. This gets more people involved and will save millions of man-years of effort over the next ten years. Moreover, "macro-genealogy," the process of studying and joining separate units of genealogical data as might typically be in GEDCOM units, can reduce the linking workload factor at least 30 times.

Operation—PC Data. Large amounts of high quality data in GEDCOM format found on home PCs or elsewhere can be converted to HTML by downloaded Microsoft Visual FoxPro programs, and then uploaded to the main database automatically or semi-automatically, without re-keying. Alternatively, for smaller collections of names or those of lower data quality, the GEDCOM or similar data can be sent to a workstation where it is matched and merged with other small GEDCOM data sets before being moved the main database in bulk, perhaps in groups of one million names.

Data Sources—Manual Entry. The system will support the direct entry and correction of all data to the full set of data fields that will be supported. For smaller collections of data, or for corrections, this manual entry will be the typical way to enter the data. A set of "Express" screens will also allow publishers to enter efficiently just the minimum identifying data about each person and his or her relationships.

Data Improvement and Database Maintenance Operations. Besides the main process of entering of new data, there will be thousands of participants locating and linking names together, as where a link can be found to a person's parents in another publisher's area. It will also be necessary to have a few skilled operators using specialized transactions to monitor operations and occasionally correct and move data within the main database, as when a set of names is transferred to a new person for maintenance, or some error of registration or billing occurs.

Data Consolidation Workstation. This set of functions can run on a specially equipped PC or on the central server. In the separate PC version, the programs accept and analyze a large number of small files, converting them to a common database format, almost identical to the main database. A series of operations then joins them together where possible, eliminating duplicates, resulting in large completed collections of perhaps one million names each, suitable for loading into the main database. More specifically the programs: (1) gather statistics on incoming data concerning such things as surname distribution (see discussion of "cones"), time and place of data, and the like; (2) analyze newly received data to determine its level of duplication with the existing database; (3) analyze incoming data to determine the number of separate "trees" or linked sets of names that are contained in the data collection, and provide a way to separate out those linked segments for treatment; (4) compute levels of possible extension to the existing database by comparing the number of missing-parent and missing-spouse names in incoming data with the data that could provide the parents (or vice versa) and thus extend the connections; and (5) for incoming missing-parent and missing-spouse names, actually make the various levels of exact or near comparisons with the new and existing database and show the candidate links to an operator for verification or probability judgement. At that point a code may be entered to indicate the level of proof or level of confidence for data and links.

Input Data to Data Consolidation Workstation Function. Many types of genealogical data exist in the world, and there must be facilities to place all such types into a common format. Some of the major categories of such data include: (1) Lineage-linked names found on home PCs. Small collections of names in various formats including GEDCOM formats, could be sent to a workstation where it would be matched and merged with other small data files before being moved the main database in bulk, perhaps in groups of one million names. (2) Lineage-linked data found on the Internet. Such data are downloaded from the Internet and converted to a form acceptable to the workstation, usually GEDCOM, if not in that form already. (3) Source record to lineage-linked records. A major conversion process is involved here before sending the data to the workstation function. The most well-documented way to create lineage linked records is to start with the source records, and, in a top-down, oldest to youngest fashion, construct the pedigree, usually in a descendant form. When a segment is completed it can be added to the main database after being consolidated. (4) International Genealogical Index (IGI) data. This huge file can be placed on a specialized large workstation and converted into lineage linked format, with removal of massive duplicates. It may still be short of the level of quality needed to enter into the main database. A comparison with paper records may be necessary. It might be done in segments and then added to the workstation for cleanup and linking. Even in its converted form, it may only be useful as a model or guide for linking of other versions of the same name, date and place data. (5) Ancestral File (AF) data. Convert this file into a suitable addition to the main database, or like the IGI, just use it as a guide while putting together other sources of the same name coverage. This could also be done in segments, and placed in the workstation for consolidation. (6) There are many other data sources and formats, but solving the above problems should take care of most situations with small variations.

Central Server Main Relational Database Structure and Use

The design for the central database is extremely important to allow for all the needed functions to go on simultaneously. The publishers, i.e., the people who prepare the names for entry into the system, will each be assigned a block of numbers as the place to enter their data. The number is made up of a sequential publisher identification number, plus an extension of up to six digits for up to one million names or larger depending on the expected contribution of the publisher. That set of numbers can be viewed by others but cannot be modified. Publishers will enter in the various kinds of data records associated with each person, and will specify the relationship links between them.

There is an area set aside for third parties to specify links between people. These third party entries can include a new name, plus a series of links to connect that name with people in other areas of the database or they might just add links between existing people.

The main table in the database is called Person_T. It contains the identifying number assigned to that person, which number is a combination of the publisher's number (nine digits at this point), plus a five or six digit sequential number, allowing up to 999,999 names in a particular submission by that publisher. The table also contains the name, the basic identifying data such as birth date, christening date, death date, or burial date, plus any comments about those basic identifying items.

Other tables containing data about the person are Text_T to hold textual biographical data, Photo_T which holds references to photo images stored about that person, and Image T to hold references to images of source records stored about that person. Other similar tables can be added as other data types are added, such as audio or video clips.

The Links_T table is used to link together all the name records in family or any other relationships. It contains just the number of the focus person, the number of the person to whom he or she is related, and the nature of the relationship. So, for example, a man with number 1 might have a wife with number 2, and the link record would have his number, her number and an indicator that the relationship is spouse-wife.

This Links_T table can be used separately from the Person_T name data record to do such things as trace one's pedigree up, down, or sideways. When the basic linking data have been gathered, the Person_T table can be used to supply the actual names for a report. The TR* (trace) temporary table is used in the search process to store the results before the report is sent to the user's screen.

The Links_T table can similarly be used to compute which names of a bulk submission are actually linked together in some way, so that the submission can be divided into "trees" for processing. In that case the WST1 * and WST2* (workstation temporary 1 and 2) tables are used as temporary work tables and the Tree_T table is used to store the final results.

The Marriage_T table holds the basic data about the marriage event and any modifying comments about the marriage. The table contains the identifying numbers of both of the people, so that the record can be found using either number.

The Links_T2 table is available for publishers to record links between people in any of the submission spaces, as they find new connections. This link record is the same as the Links_T record except that it also includes the publisher number of the person creating the link record.

The publishers must register before they can enter data, and they receive an identifying number at that time. They record their contact information, and their password. The table Publisher_t contains this information. It also keeps track of the next sequential number to be used when new person data are to be added to the data space for that publisher. It also contains their royalty status, that is, the amount earned and due to them.

The buyers of data must also register before they can enter data, and they receive an identifying number at that time. They record their contact information, and their password. The table Buyer_t contains this information. It also contains their billing information such as their credit card number, and their current balance and total usage.

Another table Buylog_T records all of a buyer's activity, including the names he has viewed and the data items he has selected. This can allow statistical review of buyer activity.

A related table Paid_t is a summary of the Buylog_t information. It is used to determine whether a buyer has ever paid for a particular name and related data sub-elements before, so that he or she will not be charged again for the same information.

The Fee_Set_T table contains the fees currently being charged for the different elements of data stored about a person. It is used both to charge the users and to assign royalties to the publishers.

The Mast_Buyer_Num table supplies the next sequential number to be assigned a new buyer that registers.

The Mast_Pub_Num table supplies the next sequential number to be assigned a new publisher that registers The HMast_Hob_Num table supplies the next sequential number to be assigned a new hobbyist that registers. Other tables beginning with an "H" serve the same purposes as the tables just described for the main database.

The MT1* (matching temporary table 1) provides workspace for the workstation matching program, as it examines missing parent, missing spouse, and missing child conditions.

The Register_cones table allows a publisher to indicate his interest and intent as to data to be added to the database. It can then serve as a place to coordinate work and avoid unintended duplication.

The Gedcom_t table is used to register and control GEDCOM projects and page inputs by publishers through the client-side HTML interface.

Shadow Deletes to Reduce Duplication. This topic is more complex than others related to data updates, so a separate discussion is provided here. The competing design goals of retaining all submissions intact while also providing maximum links between them and minimum duplication among them requires some creative database work. The shadow update method is the main technique for accomplishing this objective. This shadow method means there are two or more layers of data that must be read by any search transaction, and the result interpreted and displayed to the user.

One of the important design goals of this system is to allow any qualified person to make a data submission and to keep that submission intact. However, this almost ensures that there will be overlapping submissions and the resulting duplicate entries. With multiple occurrences of the same name, the normal consequence is that the various search screens used to gain access to the data will list all those occurrences. A user would thus have to guess which version to try, or be faced with the need to check them all out. There are anecdotal reports of one case where a request was submitted to a genealogy search engine and 20,000 hits were obtained. It would be very inefficient to check all 20,000 of these hits.

In prior genealogical databases, each name on the search list allows entry into a different pedigree structure that can be navigated and examined. For each of those names one could request an ancestor summary report and thus know which one might contain the most data and so be most interesting to examine. But that could lead to huge amounts of confusion and endless duplication of effort by all users interested in any particular set of people. It would be better to consolidate the data and minimize the number of names one needs to examine. In effect, the computer and professional participants would do most of this work before the users even looked at the data.

The solution implemented herein is to allow all the submitted data to remain in place, but to allow for any interested person to put in a transaction to remove any particular name from the search list, a special form of a delete.

When there is more than one submission that contains relationship data for any one person, it would be ideal if the best of all that data were retained for use, but the redundant data were hidden from view, but remain available for review, if needed. The redundant data might later be completely deleted, but that step is not important except for internal database tidiness.

When submissions overlap, duplicate names should have the benefit of connections to data in both submissions. So, when someone "deletes" a duplicate name, that person would also have the responsibility to see that all the right connections from the remaining name were made into the other submission that he was partially deleting.

It should be noted that the process being discussed is the third-party ADD LINK process that connects related submissions together, plus another step that removes the excess, duplicate names from any search lists to avoid confusion and wasted effort, and then checks the reasonableness of that "delete" before allowing it. In the ADD LINK scenario there are no deletes. When there are overlapping submissions, the shorter pedigree is "deleted" but links from the shorter pedigree are added to the longer pedigree. In this way, anyone who entered his pedigree structure through the search list would have the benefit of all that is known about that name.

This is a good technical solution, because it maximizes the number of links between names, although it still leaves too many routes into the data for some names. It also, unfortunately, minimizes the economic incentives for people to make these connections, since they normally get no extra income from having made those connections.

Both or all submitting parties could make all these same kinds of connections, and thus have all the paths available into the data, which paths may be nearly equivalent. But the troublesome duplication still remains to confuse the users.

As a means of increasing the economic incentive to minimize duplication, publishers could make the links needed and then through "deletes" make their names the only ones that show up in the search lists for that area of the database.

The process is cumulative. First the submitters make the connections from the shorter pedigree to the longer pedigree. Then they enter delete transactions to make the duplicate names disappear from search lists.

The computer support that can be given to this splicing/hiding process is as follows. The delete transaction contains the number of the name to be deleted, the number of the replacement name, and the user number of the person submitting the transaction. To make sure that the deleting person has done his homework (and keeps it current in the future), the delete record will have an indicator that must be set on to put and keep the transaction in effect. Before the record is stored in the database and the indicator is set on, the computer first counts the connections of the old name to be deleted. It then counts the connections of the name to replace it. The new name must have at least as many links backward (plus spouse and children—sideways and forward) as does the old name. This check is not conclusive, but it ensures that the person making the deletion has done his homework. To limit search time, the search on the new name need only go back far enough to show that it is equal to or greater then the old name. Otherwise no switch is set on, and the apparent duplication continues to appear.

It would be possible to have a transaction that automatically establishes all the needed links for the new name into the old name's submission data. But that will not be made available until after further study. Typically, there should only be two links needed to tie a person to his parents in one or two other submissions. So the burden is probably best left on the user to make both, lest the machine-made connection just add to the confusion, or prevent the study that is needed to do it properly.

It is believed that the care and thoughtfulness of a hand link done by a professional will always be superior to any automatic process. Such an automatic process has been used in the Ancestral File and has not proved very accurate. Mistakes that would be obvious to a human examiner are allowed by the computer algorithms. It is believed there is time available to do it all manually, this careful knitting together of the submission data. Once thousands of people can work together at one time, most of the barriers to completing the process are removed.

Having once taken care of the first-line names, i.e., the first point of intersection of submissions meaning those farthest back in time in one submission, the question then moves to all the other names further forward in the pedigree, the rest of the overlap area. The process is just the same, except that in the check-search, the search can stop one line of its search once it hits a "deleted" record in one of its branches. This should cut down the machine time needed to validate a proposed delete transaction.

Setting up these delete transactions to lower duplication could be a lot of work, but it will bring a good result. In most cases, the data will be quite stable. However, there is one case where the arrangement may not be too stable. This is where the data of both submissions cover exactly the same data to exactly the same depth. In that case it is not obvious who should act to delete the other's data. If one participant deletes all the other participant's data in this way, and then if the person whose data were deleted adds one generation back to his data, and the other submission administrator does not immediately add the appropriate extra links to his version of the data, suddenly the original delete transaction would not be valid on a periodic re-compute. In fact, the hiding of a whole surname line might be undone, the series of deletes might "collapse" as the most ancient delete was invalidated and then other more recent deletes further down in the submission overlay area were also invalidated.

This is good and bad—it makes the data seem unstable in some rare cases, but it also puts the onus on the party making the deletion to keep extending the data so that his data are not deleted by another. There is a financial incentive to avoid having one's data deleted in that income is lost to another person if one's data are deleted and the other person's data are used.

Indexing and Cross-Reference. One valuable service the central genealogy system will provide is the indexing and cross indexing of the mass of data that exists on genealogy topics. As names are entered into the Genealogy Registry system and their source references are added, the participants will be constructing an index, whether or not the original record set had its own index. As multiple source references are added for each person, suddenly new record-set interrelationships become possible, for automatic or manual construction and use. This concentration of data around historical individuals also makes possible studies that would not be feasible otherwise.

A social history methodology known as "records stripping" has been used to index and analyze all available historical records from an area to obtain a picture of life at a certain place and time, a technique used to good effect in early American history in Virginia, Maryland, Massachusetts, and so forth. If many researchers put many source references into the Genealogy Registry system for each person, from many different record types, a kind of "records stripping" social history database on a national scale would be produced. The researchers could be anywhere in the world where they might have access to the records, instead of having to have a group of students or data entry people organized just for that purpose for a specific area. With all those kinds of records pivoted on or indexed to one person, you would also then automatically have cross-references among all the kinds of records so indexed. That might include cross-references between records of the same type but with different cataloguing because at a different archive location, or between records of different types. Having found one person with a link into the records you might be interested in, you could use that link to help find other related persons mentioned in those records, such as children, wives, parents, neighbors, and the like.

Similarly, working from the opposite direction, there might be indexed records that have the same source reference notation, such as two census records entries, or two land record entries, perhaps put in by different people, where both references point to the same person or to related people (on a common page). These matching references could then be checked to see what people they point to. If they point to the same person, you might not have any new information, but just a confirmation. Or if they point to two different numbered people with the same name, a duplicate situation that needs attention may have been found. It is simple to reverse cross-references, and it is quite remarkable what they can do to point out errors, duplicates, and omissions.

If the people pointed to are different but related, their names should be added to the database if they are not already there, and the new references could be added or linked, as appropriate, to the individuals involved, thus more nearly completing the "records stripping" process for a few more people.

All the above processes provide incremental "puzzle solution" methods of going from the known to the unknown as steps in completing all links and all possible source documentation for each and every person. When the process reaches its logical conclusion, there will be a "records stripping" result for the entire nation or world—integrated indexes from and to all people and records. This completed database would provide a window into the lives and times of all these people.

Researchers who wish to integrate the information from all the indexed sources might have to go to each of those referenced record sources to get the data they need. However, in the perfect case, all the records would be available online in image or text form so that a researcher could quickly compile all the data on any particular person or group.

There will often be some more esoteric benefits from having all these records indexed to one person. Higher level cross-references can be constructed from these data, either automatically or manually, depending on record counts and structure. At a minimum, having seen the constellation of record references that relate to one person, there might be some logical leaps to other useful related data.

One notable and practical study of this type focused on the differing tobacco raising and marketing techniques of Virginia versus Maryland over a two hundred year period. It comprised mostly commercial data that were historically recorded and survived for use in the study. If data of other types survived, there could be many other more personal possibilities. The key, of course, would be to begin by asking useful questions that the combined data can answer. Could court records for a particular area be used to show what landowners were more contentious than others? Did this indicate a feud of some sort? Could the travels of a relative who was a census taker or tax collector be reconstructed from land records and the census and tax data that were recorded? Could the building of a family dynasty be traced through marriage and land acquisition? Land and marriage records might tell this story. Health and mortality records could indicate that an area of the county was more or less healthy than some other area, perhaps because of mosquitoes, cholera, snakes, and the like.

The regular features of the database would make possible what has been mentioned above. The basic first and second level indexes are already part of the system. How might the more esoteric indexes or cross-references, once created, be stored for general use? Presumably they would each be fairly small, since they would typically cover only a small geographic area.

Theoretically, dozens of cross-reference indexes could be built using the "records stripping" data all indexed on single names. Twelve record sets taken two at a time would comprise 66 cross-references. But all might not be useful combinations. It would be possible to create temporary subsets of these derivative cross-references as needed by selecting on an area, time, or the like. The underlying data would be changing all the time, so a permanent index could cause problems by not staying current.

Although the exact process is not described in minute detail, it is assumed that the "records stripping" process used by others was done by someone entering all the names they could find in various source documents, then copying all the records on paper or microfilm to transport to an office for detailed study. The indexes could then be used to examine all the data. In many cases the source records were entered completely in machine-readable format so that the data could be quickly consolidated for any particular person or family. Also, family structures could be assembled.

Some cross-references would be of fairly general use. For example, a census-name-to-land-ownership-record cross-reference could be constructed mostly automatically, as a spin-off from the "records-stripping" activity described above. It could be very large and might be entitled to have a permanent place of its own.

Other created cross-references could be stored using techniques found in the old CICS Mantis/VSAM mainframe methods. Two generic cross-reference fields would be provided and indexed. A cross-reference type identifying number would be assigned to each record. A title file would record what kinds of indexes/data were available and the number of the index to be used to access it.

Returning now to the index facilities provided by the basic Genealogy Registry system, the cross-reference record has just two fields—the person number and the source record reference. Sorting it by the person number shows what source records were entered for one person. Sorting it by the source record reference shows what people may be covered by one reference, such as many people on a single census page. If all the people on the page do not show up, then someone has not entered them all or has not added the source references to their entries.

Record Counts. The data processing consequences of such record stripping processes will now be briefly discussed. If it is assumed there are 12,000 people to be studied and 20 available entries for each person in a lifetime, then there are 240,000 index entries to be made. That might include 200,000 document pages, assuming there are multiple names per document page in some cases. At 300 pages per inch, that is 700 inches, or about 60 feet of shelf space, or about 10 filing cabinets full. Those 20 entries per individual might be about 20 pages of data for each person. For example, there might be 5 census entries in 50 years, 1 cemetery entry, 1 birth entry, 1 death entry, 1 marriage entry, 1 jail entry, 1 probate entry, 2 and entries, and so forth.

These rather large record counts could make the data entry process rather expensive. However, if the work can be widely distributed among participants, it becomes more feasible, especially if there are many descendants of the studied group who might be willing to contribute some time and effort through a central mechanism.

The programs that are detailed above are sufficient to run the basic version of the system and do what is necessary to be successful. However, there are several important enhancements that may be added to increase the versatility and power of the system.

Source Records to Linked Records Processing. This is a feature that could be the source of huge amounts of quality data for the site. For example, all of the decennial census records for 1790 through 1960 for an entire state, or a smaller area if a full state proves impractical, can be taken. It may even be better if done regionally, using portions of the state or even portions of cites. That would allow the data workers to get to know the whole city or area and be able to make the right connections.

Many people could enter the raw data, or assemble it from existing sources. A smaller number of people could then put it together. It would be important to provide the maximum computer support to encourage work in this area.

The data would be viewed as layers of data to be combined about the same people. Having so much data all at once should allow nearly all ambiguities and possible solutions to be matched at once—e.g. all the local John Smith's would be together, so one could sort them all out, or at least identify all the questionable ones.

It would be similar to the problem of linking the family fragments found in the IGI, but the census records may actually contain more data useful for linking generations. The best possible accuracy should be obtained since the data comes directly from source records.

As with the IGI and other data, the workstation programs would be used, which provide "missing parent," "missing spouse," and missing child" logic for linking.

Figure 3:
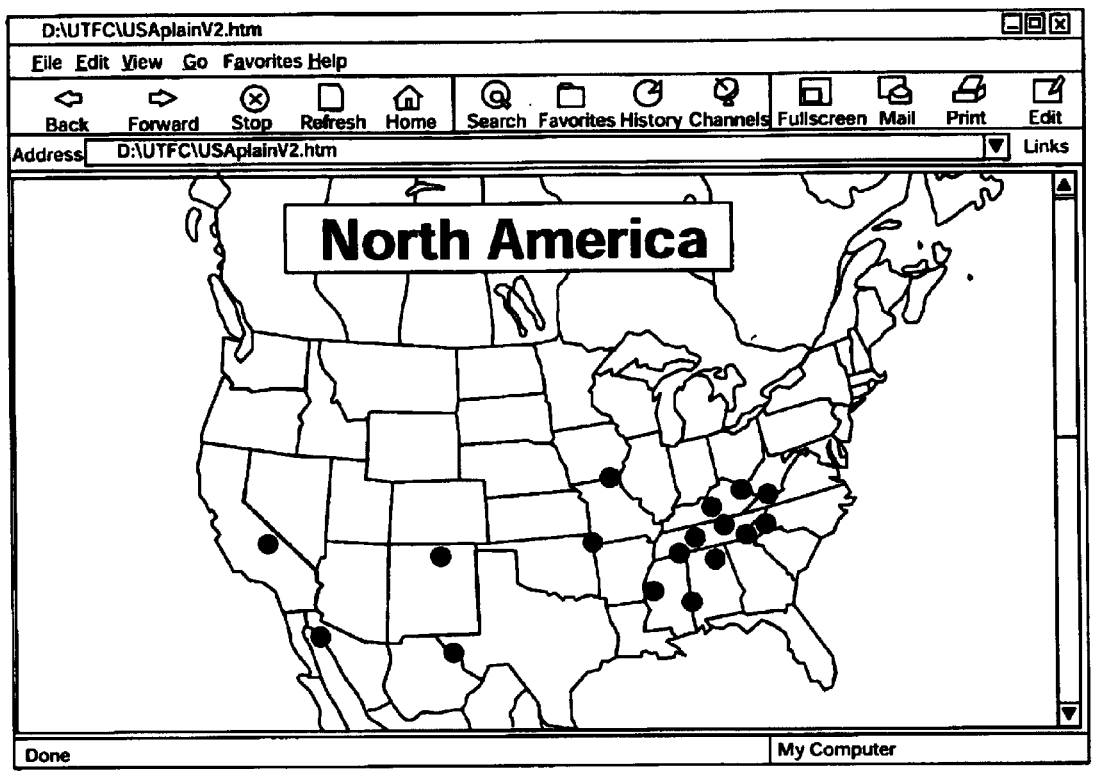
FIG. 3 shows an illustrative screen view of locations on a map of North America according to the present invention.

Maps Showing Locations of Ancestors' Births, Marriages. Deaths, Burials, or Other Data. There are at least three ways to solve this, and two of them have been used in a prototype of the genealogy registry system. A set of maps, with the latitude/longitude ranges pertaining to them, and a full X/Y overlay to plot points, put all together as an HTML/GIF set, and handed to the server to return to the user is one way of handing this. The map is just a normal HTML/GIF page of the US, Europe, and so forth, and then a transparent GIF overlay is created with the plotted point data. This was the method used to create the sample screen print shown in FIG. 3.

Another way to handle this question is to pass data and parameters to Microsoft Excel and have it send back a map in HTML/GIF format and then make that page available to the user. The data would be collected and summarized using SQL from the main database and then passed in tabular form to the map subroutines (classes). A demonstration of this procedure has been carried out by manually creating an Excel map using test data (not shown).

A more sophisticated mapping service could be constructed using such resources as the U.S. Geological Survey maps and aerial photos available at http://mapping.usgs.gov.

Conversion of International Genealogical Index (IGI) to Genealogy Registry Database.

The IGI is a huge database of about 300 million names. It mostly contains family fragments, such as two people being married, and two people having a child. This mass of data would be sorted into potential family form, using the three person parent-child records to construct the family with the full set of children, and then use the marriage records to confirm the couple's marriage.

However, more research and a small test case would need to be done to make sure this is feasible. It is believed that it is possible to get a person's birth date by using the proper three-person record. But since many of the dates in the IGI are dates with no relationship to the real birth dates or marriage dates of the people involved, it may be very difficult to get the basic data needed on the people. Moreover, there is also massive duplication throughout the database as many descendants have recorded events for the same set of ancestors.

If this data source is used, it would first be reduced to a tentative family form as described above, and then made available to seasoned genealogists to compare to other records, such as the family group sheets that were often the basis for the events recorded in the IGI. If the quality problems prove too difficult, other source records would be used instead.

The routines developed and tested for the data consolidation workstation function, which measure interconnectedness and duplication, would be modified to start with the consolidated fragments of families, and apply the same link-seeking logic used for GEDCOM input. The next processing steps could be carried out using the standard system features.

Conversion of Ancestral File (AF) to Genealogy Registry Database. It might be helpful to get a copy of this 30 million name lineage-linked database and try to add it directly to the main system. However, the quality problems are formidable and it may be that this database will not in fact be useful. Most of the data were submitted long ago by people who were just beginning genealogy hobbyists performing a church assignment, and there are likely to be many errors. There are likely to be few, if any, source record references. It may be that the only way to use this database is to have more careful genealogists take the data, check it, add source record references and submit it piecemeal.

From a programming standpoint, this is really just a simple conversion problem. The existing GEDCOM routines could probably be used without modification. No really new development would be necessary. The data would be added to the Genealogy Registry database, and the normal correction and linking processes could be used until it reached a satisfactory quality level.

Automatic Coordination of Research Report—Compute High Interest Areas of Database Based on User Data Requests. People who use the system will, in essence, be voting with their user fees for the areas of the database they want to see extended. After many users have examined and used the database, areas of high interest will be computed based on their cumulative choices. The process will involve scanning all names that are at the end of a surname line, where the next set of parents is missing, and determining whether those last names in the surname line have been purchased by one or more buyers. Such purchases will indicate a likely interest in knowing the next generation back. The report will especially focus on those names which have large numbers of buyers, indicating many interested descendants. These names and database areas should be of special interest to researchers. The report will be available online to researchers to help them plan their work. The system will also allow for a name reservation system for researchers to use to prevent duplication of research in these new areas.

An illustrative automatic research coordination report is shown in FIG. 4. This illustrative report shows a list of surnames for which no parents are linked to the earliest person in pedigree. The birth year and identification number of such person are also provided in the report. In addition, the number of database users likely to be interested in data that would extend the database to an earlier time in a pedigree is also provided. Such a report shows high interest areas, which should spur and focus research plans. As a separate but related feature, the system allows publishers to express their intent to do a particular research task, which will help in avoiding duplication of efforts. Other publishers or researchers may propose cooperation, if appropriate. Publishers can also use this feature for finding a user or group of users that may want to fund the project. Similarly, users can also describe a task to be done and then seek both assistance in funding it from other users and estimates and proposals from interested publishers or researchers. These task definitions and reservations are intended to be at a much smaller and more detailed level than the broader ones the publishers use to define their general domain of responsibility. These task definitions and reservations may be limited to just one or a few names on a particular surname line. The present system automates much of the advertising and negotiation process to find and match buyer groups and seller groups for specific tasks.

The next logical enhancement would be to add an "auction" system which would enable either database users or researchers to propose specific research projects and agree to contract terms among themselves. Finally, the feature set could be broadened to prepare similar statistics on possible lists of expected, but missing, spouses and children.

Virtual Reality Interface. This feature has been briefly described above, and the basic software to construct such an interface exists and has been used to create and display a valid and working prototype. The prototype Virtual Reality Modeling Language (VRML) world model of a family tree uses VRML code generated at the server for each data request, and the Cosmo Player browser plug-in is used at the user PC level to display and manipulate it. The virtual reality feature uses exactly the same data as the normal interface, and the overwhelming thrust and priority of this effort is to get the data into the best possible format and condition. In the virtual reality presentation, the data will be presented in a different way, making much larger amounts of data visible at one time, or at least seem to, with quick zooming and panning as the user follows his interests in the database. It will require a faster-than-normal internet connection, and either a larger-than-normal monitor or special virtual reality attachments. The faster speed connections are becoming more common, so use of this feature may soon merely depend on having the correct equipment at the user's location. Either a virtual reality headset or a 21-inch monitor may be needed to get the intended experience, but it may be possible to use a normal 15-inch monitor and have a more restricted experience. The first version would be read-only. Later versions could have limited update capabilities.

Figure 5:
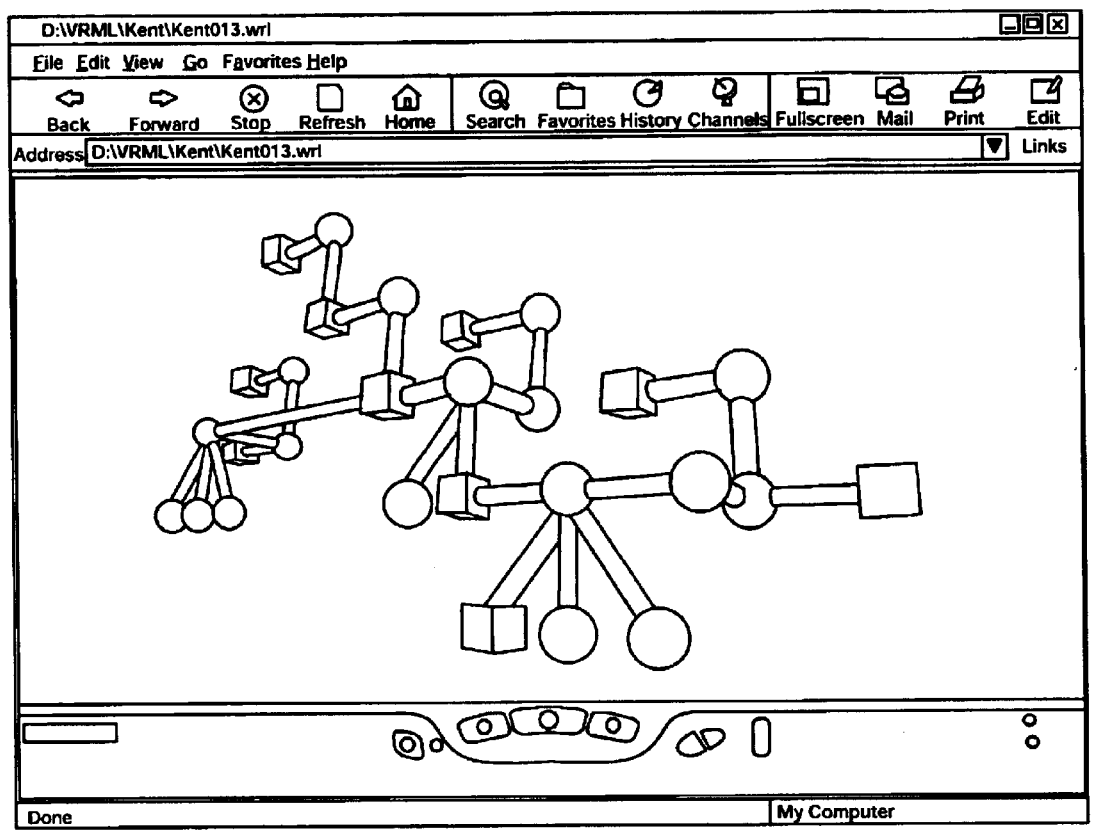
FIG. 5 shows an illustrative screen view of output in a three-dimensional virtual reality format according to the present invention.

The normal pedigree charts present only a very limited two-dimensional view of reality, instead of the 3-D network world in which we live. A running system to assemble the data in the correct format to get the full result envisioned has been created. There are virtual reality plug-ins available for browsers that can do the very thing needed. The virtual reality plug-ins accept shape descriptions that can then be displayed in 3-D, and then those shapes can be manipulated. All these concepts were tested in creating the demonstration version of the virtual reality interface, such as is illustrated in FIG. 5.

From the parameters given to the virtual reality interface, the system would choose the size of the building to show (the set of names to be displayed), and would also know which names to be shown first. The user could then decide which names to see next as the name structures were navigated.

The first version will be for a large monitor, but there is also more sophisticated software and hardware available that can be used for a true 3-D version. For example, the recently available inexpensive ELSA 3-D stereo gaming glasses allow multiple people to share the same view as though moving together as a group, which would constitute the ultimate genealogy data reviewing experience.

To drive the virtual reality interface, the server would have to take in the selected data from the database on individuals and links and create the syntax, language, and the parameters that describe the proper shapes, the spheres and rods, to the browser plug-in. It would also have to check the database to see what other data items were available for each person and construct menus for each to allow the virtual reality user to request those data. The menus would have links back to the available data. When selected, the text, image, or video segment would be brought in with its appropriate player. At the end, the focus would return to the 3-D network screen.

The virtual reality user would have to indicate the first name to begin with. The server would then select all the related names for perhaps three generations in any direction, that is, the focus person plus two generations or levels in any direction. For example, his wife and her parents and siblings would be shown, his grandparents and his parent's siblings would be shown, and his children and grandchildren would be shown. The names could go out a larger number of generations, but it might just crowd the screen and overload the server without much benefit to the user.

As the user moved off from the starting focus person, the system could adapt in one of several ways. At every move of one person in any direction, the entire set of three generations could be reconstructed so that there was always two more to go in any direction. Another possibility would be to not trigger a reload until the focus moved two or three steps or reaches the edge of the current displayed network of names. A third possibility would avoid database access and re-compute time by sending most of the parameters back to the server in the output stream, to be reformatted and sent back, with only the necessary new data added.

The look-ahead feature might be compared to a similar feature on a fast CPU chip, which requests data and prepares ahead for either possibility of a branch based on a comparison. Since the interface must show many more people than may actually be used, there is a need for high bandwidth to keep the performance at a satisfactory rate.

The 2-D all-relationship form, with just 2 levels of generational relationships, usually shows about 8 people—the focus person, the parents, the spouse, and the children. With 3 levels of relationship in each direction, the number of people would typically jump to about 50. One might experiment with more than 3 levels or generations in all directions to see the performance and usability effects. The new 3-D gaming glasses with a fast Internet connection and a powerful PC and video card could probably extend the view significantly.

Online "Auction" or "Bulletin Board" Facility. This facility automates much of the notification and negotiation process to find and match a buyer or groups of buyers with a seller or groups of sellers to accomplish specific genealogy research tasks.

The Automatic Research and Coordination Report (e.g., FIG. 4) reveals high interest areas of the database to spur and focus research plans. As a separate but related and more general feature, the system allows publishers to express their intent to do a particular research task so that others will know to avoid duplicating it. Alternatively, others may propose cooperation in accomplishing the research task, if that is appropriate. Publishers could use this feature to try to find a user or group of users to individually or collectively fund the project. Similarly, users could also describe a task to be done and then seek both assistance in funding it from other users and estimates and proposals from interested publishers.

These task definitions and reservations are at a much smaller or more detailed level than the broader ones the publishers use to define their general domain of responsibility. They may be limited to just one or a few names on a particular surname line.

Publisher and User Processing

Figure 6:
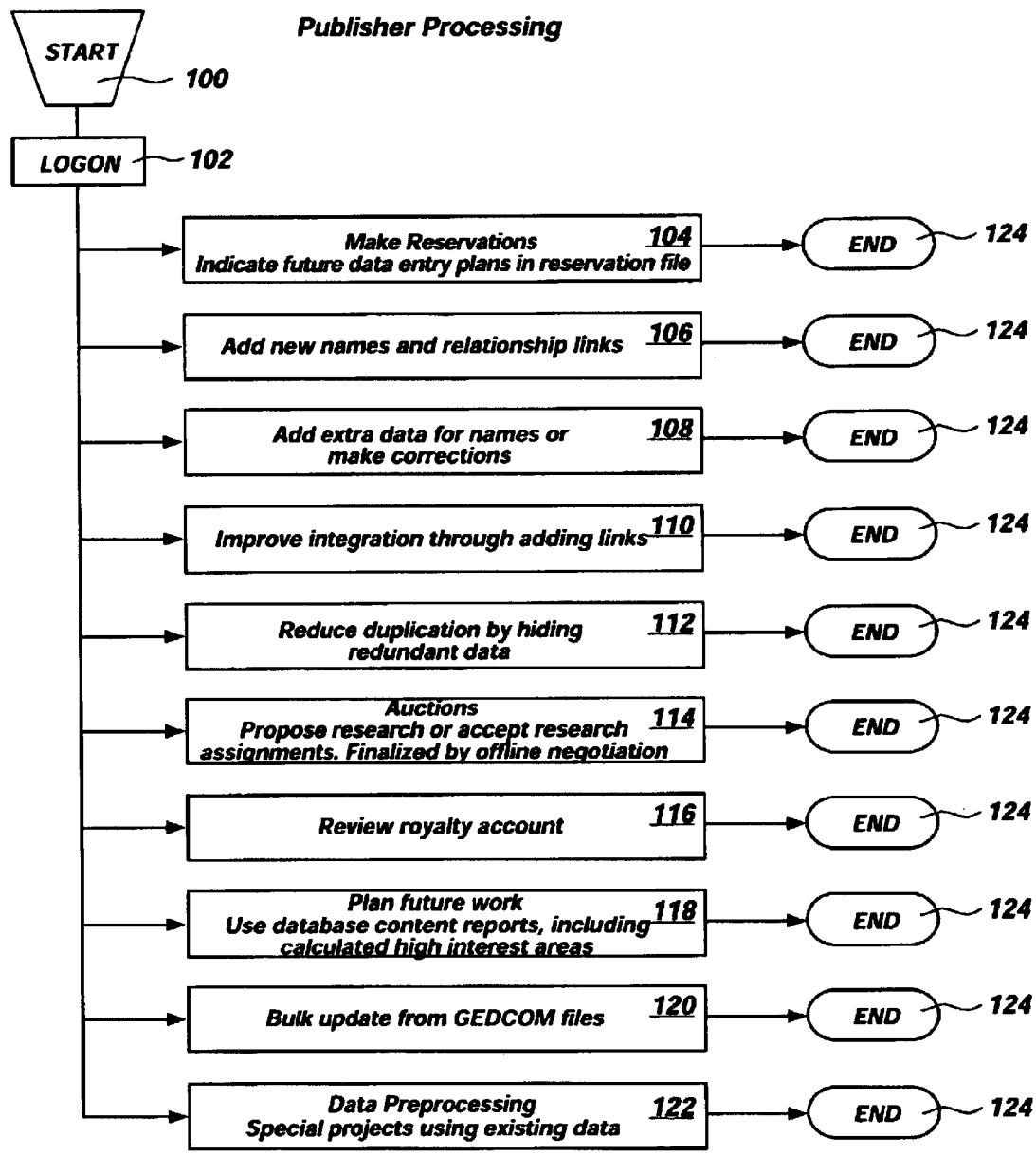
FIG. 6 shows a flow chart of illustrative transactions that can be made by a publisher using the genealogy registry system of the present invention.

FIG. 6 summarizes the transactions that a publisher can make with the genealogy registry system of the present invention. The publisher starts 100 any transactions with the system by logging on to the system 102. After successful logon, the publisher can transact any of the following: make reservations 104 by indicating future data entry plans in the reservation file, add new names and relationship links 106, add extra data 108 for names already in the database and/or make corrections to data, improve integration through adding links 110, reduce duplication by hiding redundant data 112, participate in an auction 114 by proposing research or accepting a research assignment, review the publisher's royalty account 116, plan future work 118 through use of database content reports including calculated high interest areas, make bulk updates from GEDCOM files 120, and preprocess data 122 such as special projects using existing public data. The publisher can end 124 the session at any time.

Figure 7:
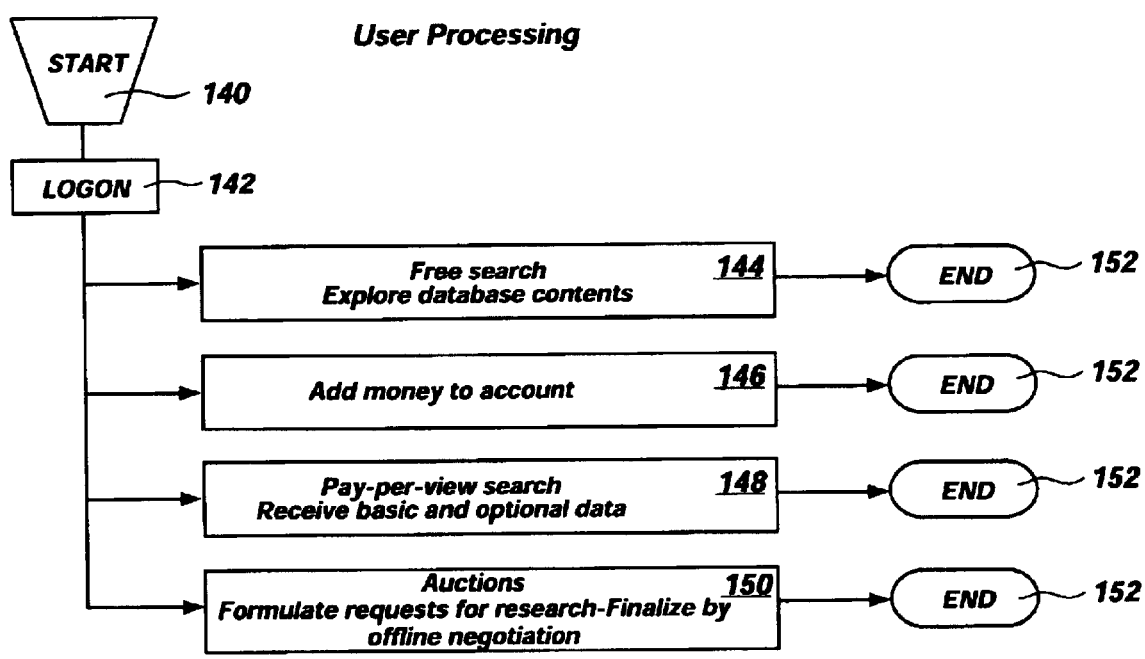
FIG. 7 shows a flow chart of illustrative transactions that can be made by a user of the genealogy registry system of the present invention.

FIG. 7 summarizes the transactions that a user can make using the genealogy registry system of the present invention. The user starts 140 any transactions with the system by logging on to the system 142. After successful logon, the publisher can transact any of the following: conduct a free search 144 such as exploring the general contents of the database, add money to the user's account 146, conduct a pay-per-view search 148 including receive and optional data, and participate in an auction 150 such as formulating requests for future research. The user can end 152 the session at any time.

The subject matter claimed is:

1. A genealogy registry system for collecting, summarizing, indexing, lineage-linking, and displaying genealogy records information on a computer comprising:
    (a) a central server database comprising
        (i) a plurality of contributors' data spaces for storing genealogical data in lineage-linked form,
        (ii) a submission link space coupled to the plurality of contributors' data spaces for making and storing links between genealogical data items in each of the plurality of contributors' data spaces, and
        (iii) a third-party link space coupled to the plurality of contributors' data spaces for making and storing links between genealogical data items between the plurality of contributors' data spaces;
    (b) a text and graphics interface coupled to the central server database;
    (c) a data display coupled to the text and graphics interface;
    (d) a data status and management mechanism coupled to the text and graphics interface for monitoring quantity and quality of data;
    (e) a manual keying interface coupled to the central server database for inputting and correction of data; and
    (f) a data conversion and automated input coupled to the central server database for converting data into usable format and inputting large data files.

2. The genealogy registry system of claim 1 further comprising (g) a workstation functions interface coupled to the central server database for converting and consolidating data into usable format.

3. The genealogy registry system of claim 1 wherein the data display comprises a mechanism for billing by segment of information displayed.

4. The genealogy registry system of claim 1 further comprising a plurality of interactive self-service internet terminals and central servers configured for accepting genealogical data from a plurality of publishers and displaying such genealogical data to a plurality of users.

5. The genealogy registry system of claim 1 wherein the system is configured for internet transactions to allow updates and review by a plurality of selected persons.

6. The genealogy registry system of claim 1 wherein the central server database comprises a structure for storing one or more data items selected from the group consisting of basic identifying data, explanatory text, biographical text, source references, photographs, and images.

7. The genealogy registry system of claim 1 further comprising a program permitting both minimal data display and update and full detail data display and update.

8. The genealogy registry system of claim 1 further comprising a program and data structure configured for storing latitude and longitude indicators for all major identifying events, including birth, death, marriage, and burial, such that tables, maps, and reports can be created for correlating such events with location.

9. The genealogy registry system of claim 1 further comprising a program and data structure configured for storing place names by date and by latitude and longitude.

10. The genealogy registry system of claim 1 further comprising a program and data structure configured for storing medical, genetic, and health history data.

11. The genealogy registry system of claim 1 further comprising a mechanism for permanent storage of assembled data.

12. The genealogy registry system of claim 1 further comprising a program and data structure for storing and processing data in a plurality of languages using the language and characters of original records with transliteration and translation to English.

13. The genealogy registry system of claim 1 further comprising a program and data structure for reserving and assigning to a single publisher creation and maintenance of a selected set of names based on at least one of time, place, surname, or record set, and indexes to such assigning for notifying others of current assignments.

14. The genealogy registry system of claim 1 further comprising a program and data structure configured for permitting data submissions by a publisher to be stored independent of submissions by other publishers while being available for integration with other data submissions through a separate system of linking names that is accessible to such other publishers.

15. The genealogy registry system of claim 1 further comprising a program and data structure for allowing a selected person to link names within or between one or more other publisher's submissions without changing the underlying data.

16. The genealogy registry system of claim 1 further comprising a program and data structure configured for permitting an authorized person to create shadow delete records wherein duplicate names can be removed from search lists and duplicate data can be hidden from users without being deleted from the database.

17. The genealogy registry system of claim 1 further comprising a program for providing summaries by surname and oldest birth date linked to a user or nearest relative thereof.

18. The genealogy registry system of claim 1 further comprising a program for identifying a closest common ancestor, if any, for two randomly selected people.

19. The genealogy registry system of claim 1 further comprising a program for displaying all relationships for a selected person.

20. The genealogy registry system of claim 1 further comprising a read-only virtual reality user interface configured for permitting a user or group of users to receive immediate visual and aural access to the data in the database, wherein the data appear as objects in a three-dimensional world with which the user can interact.

21. The genealogy registry system of claim 1 further comprising a virtual reality user interface configured for permitting a user or group of users to receive immediate visual and aural access to the data in the database, wherein the data appear as objects in a three-dimensional world with which the user can interact, and whereby an authorized user can modify the database.

22. The genealogy registry system of claim 1 further comprising a mechanism configured for allowing a publisher or other authorized person to examine the database for assessing completeness of coverage of a selected time, place, surname, or record set such that the publisher can discover what data are in the database and what data are missing.

23. The genealogy registry system of claim 1 further comprising first-level indexes to names and source records such that measures of population and record coverage can be estimated.

24. The genealogy registry system of claim 23 further comprising second-level cross references between source records and names such that measures of accuracy and duplication can be applied to the data, and measures of completeness of coverage of a record set can be estimated, and cross indexing can be accomplished between multiple versions or copies of the same record set.

25. The genealogy registry system of claim 24 further comprising third-level cross references of source-to-dissimilar-source records such that the database can supply consolidated cross reference indexes among multiple record sources linked through specific people.

26. The genealogy registry system of claim 1 further comprising a program for automatic conversion of a user's lineage-linked data into a format suitable for automatic update of the database over the Internet.

27. The genealogy registry system of claim 1 further comprising a program and data structure configured for capturing, converting, and consolidating lineage-linked genealogy data collections stored for public view on the Internet.

28. The genealogy registry system of claim 27 wherein incoming lineage-linked data collections are automatically analyzed and divided into trees of interconnected names.

29. The genealogy registry system of claim 1 further comprising a program configured for analyzing incoming lineage-linked data collections for consolidation with existing data, eliminating duplicates, and finding and displaying missing linkages in incomplete pedigrees.

30. The genealogy registry system of claim 1 further comprising a program and data structure configured for supporting automated mass consolidation of unlinked source records into multi-generation lineage-linked form.

31. The genealogy registry system of claim 1 further comprising a program and data structure configured for converting data from Ancestral File into a format compatible with the present system and for online review and correcting of such data.

32. The genealogy registry system of claim 1 further comprising a program and data structure for consolidating data from International Genealogical Index into pedigree form, and for online review and correcting of such data.

33. The genealogy registry system of claim 1 further comprising a program and data structure configured for automated comparison of overlapping lineage-linked genealogy files and removal of duplicates and merging of data.

34. The genealogy registry system of claim 1 further comprising a program and data structure for coding of confidence levels or accuracy indicators on data elements selected from the group consisting of birth dates, birth places, and relationship links.

35. The genealogy registry system of claim 1 further comprising a program and data structure configured for accounting of royalty payments to publishers of data based on use of such data and charging user fees to users of such data.

36. The genealogy registry system of claim 35 wherein parameters for royalty payments and user fees can be varied according to user, publisher, name, and data element.

37. The genealogy registry system of claim 1 further comprising a program and data structure configured for allowing a user to separately select for viewing each item of data about a name.

38. The genealogy registry system of claim 1 further comprising a program and data structure configured for billing a user only once for each item of data viewed, regardless of the number of times the item is viewed.

39. The genealogy registry system of claim 1 further comprising a program and data structure configured for controlling a number of names accessed per unit time.

40. The genealogy registry system of claim 1 further comprising a program and data structure configured for producing a copy of the central server database wherein said copy is configured such that data quality parameters can be different than for the central server database.

41. The genealogy registry system of claim 40 wherein users of the copy are billed at a different rate than are users of the central server database.

42. The genealogy registry system of claim 1 further comprising a program and database structure configured for producing a research coordination report for identifying areas of user interest based on user name selection and fee payment patterns and for facilitating research planning and contracting.

43. The genealogy registry system of claim 1 further comprising a program and data structure configured for matching one or more publishers of research data with one or more users of such data.

44. The genealogy registry system of claim 43 wherein said one or more publishers can announce and register research plans and seek funding commitments, and said one or more users can make such funding commitments.

45. A method for collecting, summarizing, indexing, lineage-linking, and displaying genealogical records information comprising:

(a) providing a genealogy registry system on a computer comprising:
  (i) a central server database comprising
    (1) a plurality of contributors' data spaces for storing genealogical data in lineage-linked form,
    (2) a submission link space coupled to the plurality of contributors' data spaces for making and storing links between genealogical data items in each of the plurality of contributors' data spaces, and
    (3) a third-party link space coupled to the plurality of contributors' data spaces for making and storing links between genealogical data items between the plurality of contributors' data spaces,
  (ii) a text and graphics interface coupled to the central server database,
  (iii) a data display coupled to the text and graphics interface,
  (iv) a data status and management mechanism coupled to the text and graphics interface for monitoring quantity and quality of data,
  (v) a manual keying interface coupled to the central server database for inputting and correction of data, and
  (vi) a data conversion and automated input coupled to the central server database for converting data into usable format and inputting large data files, and storing genealogical data on the central server database in lineage-linked form;
(b) establishing links between genealogical data items; and
(c) displaying genealogical data in response to a request for data and billing a user for data displayed in response to the request.

46. The method of claim 45 further comprising paying a royalty to a contributor of genealogical data that are displayed in response to a request.

* * * * *